US011300290B2

(12) United States Patent
Cohen

(10) Patent No.: US 11,300,290 B2
(45) Date of Patent: Apr. 12, 2022

(54) HIGH TURNDOWN BOILER AND SYSTEM AND METHOD FOR CONTROLLING A BOILER

(71) Applicant: MESTEK, INC., Westfield, MA (US)

(72) Inventor: Kenneth W. Cohen, Mahwah, NJ (US)

(73) Assignee: Mestek, Inc., Westfield, MA (US)

( * ) Notice: Subject to any disclaimer, the term of this patent is extended or adjusted under 35 U.S.C. 154(b) by 0 days.

(21) Appl. No.: 16/373,728

(22) Filed: Apr. 3, 2019

(65) Prior Publication Data

US 2019/0301732 A1 Oct. 3, 2019

Related U.S. Application Data

(60) Provisional application No. 62/651,886, filed on Apr. 3, 2018.

(51) Int. Cl.
*F23D 14/34* (2006.01)
*G01N 21/3504* (2014.01)
*F23D 14/60* (2006.01)
*G01N 21/31* (2006.01)

(52) U.S. Cl.
CPC ............. *F23D 14/34* (2013.01); *F23D 14/60* (2013.01); *G01N 21/3504* (2013.01); *F23D 2208/00* (2013.01); *G01N 2021/3133* (2013.01)

(58) Field of Classification Search
CPC .................................. F23N 5/08; F23N 5/082
USPC .................................................. 431/79, 12
See application file for complete search history.

(56) References Cited

U.S. PATENT DOCUMENTS

| 3,304,989 | A | * | 2/1967 | Alexander | F23N 5/20 |
| | | | | | 431/71 |
| 3,765,820 | A | * | 10/1973 | Ito | F23N 5/082 |
| | | | | | 431/75 |
| 4,639,213 | A | | 1/1987 | Simpson | |
| 8,387,399 | B1 | * | 3/2013 | York | F23R 3/286 |
| | | | | | 60/772 |
| 2012/0304903 | A1 | | 12/2012 | Lobo et al. | |
| 2014/0075953 | A1 | | 3/2014 | Myers et al. | |

OTHER PUBLICATIONS

Canadian Office Action issued in corresponding Canadian Patent Application No. 3038928 dated Apr. 28, 2020.

* cited by examiner

*Primary Examiner* — Vivek K Shirsat
(74) *Attorney, Agent, or Firm* — Grogan, Tuccillo & Vanderleeden LLP

(57) ABSTRACT

A heating device includes a combustion chamber, a housing in fluid communication with the combustion chamber, a burner disposed in the housing, a blower assembly connected to the housing for directing air into the interior of the housing, a valve assembly connected to the housing for controlling a flow of fuel into the burner, an optical color sensor for sensing a color profile of a surface of the burner, and a control unit configured to control the valve assembly in dependence upon the color profile of the surface of the burner.

11 Claims, 1 Drawing Sheet

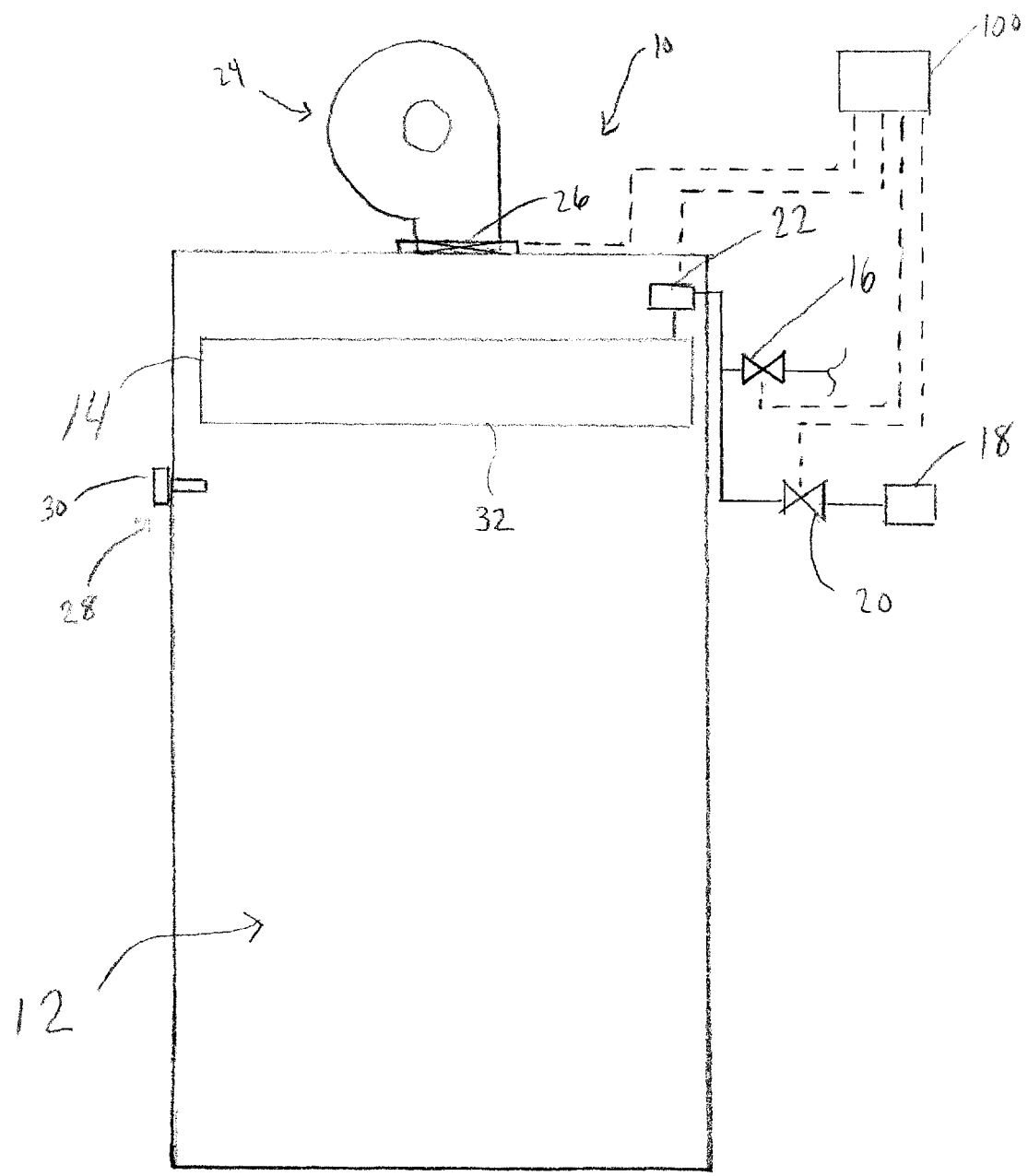

HIGH TURNDOWN BOILER AND SYSTEM AND METHOD FOR CONTROLLING A BOILER

CROSS REFERENCE TO RELATED APPLICATION

This application claims the benefit of U.S. Provisional Application Ser. No. 62/651,886, filed on Apr. 3, 2018, wherein is hereby incorporated by reference herein in its entirety.

FIELD OF THE INVENTION

The present invention relates to heating devices and, more particularly, to a high turndown boiler, and related system and method for controlling a boiler.

BACKGROUND OF THE INVENTION

Burners which combust gas or other fuel are widely known. Gas burners, incorporated for example into indirect heating devices, utilize the combustion of a gas or similar fuel (e.g., propane, natural gas, or fuel oil) for heating a work substance, oftentimes a flowable substance such as air or water. In operation, natural gas or other fuel is controllably forced through a nozzle or jet portion of the burner, where it is intermixed (most typically) with air from a blower, forming a gas spray or aerosol for enhancing combustion. In premix burners, some or all of the air required for combustion is mixed with some or all of the fuel prior to burning. To start the burner, a pilot is ignited, which in turn is used to ignite the main burner on demand.

In the case of an indirect heater, the combustion product (heated air/plasma) is directed into a heat exchanger, where the energy produced by the combustion process is transferred to the working substance to be heated. The combustion exhaust is then moved to an exhaust exit, possibly after one or more recirculation steps or the like to further recapture heat from the combustion product. A cylindrical housing is often employed to cover most or all of the components.

For a gas heating device, the amount of fuel burned per unit time (e.g., liters or btu per hour) is referred to as the firing rate. Simple heating devices are configured to run at a single firing rate, with the heater being cycled on and off in cases where it is desired to achieve an average output that is less than the maximum possible output. If a heating device is capable of steady state operation at two or more firing rates within acceptable combustion parameters (e.g., combustion byproducts are kept to below a desired level, according to ANSI safety and performance standards or the like), this is referred to in the industry as "turndown." In other words, while keeping within acceptable operational parameters, it is possible to "turn down" the heating device from the maximum possible firing rate to one or more lower firing rates. The ratio of the highest firing rate to the lowest firing rate in a heating device, at steady state operation and keeping within acceptable operational parameters, is referred to as the "turndown ratio" of the heating device.

High turndown ratios are desirable for achieving greater levels of efficiency in a heating device. For example, although it is possible to vary the average actual heat output of a single firing rate heating device by cycling the device between on and off operational modes, this can result in low levels of combustion efficiency, higher levels of fuel use per unit heat output, and a greater level of undesirable combustion byproducts. Among other reasons, this is because the conditions in the combustion chamber vary widely over time as the combustion process is turned on and off. When combustion is ongoing, the gas spray produced by the burner is consistent, and the temperature in the combustion chamber is high, factors that favor efficient operation. However, when combustion is turned off or restarted, this results in temperature variations in the combustion chamber, and variances in the quality of the gas spray input, factors that inhibit efficient operation.

At higher fire rates (i.e., low turndown), the velocity of the air/fuel mixture is sufficient to cool the burner, resulting in a high tolerance to air/fuel variation. However, as input is reduced (increased turndown), the fuel mixture combusts closer to the burner surface. It is necessary to keep the burner temperature from becoming excessive, as this can result in burner sag, reduced life and potential flashback. The consequence is that increased air must be introduced (a higher air/fuel ratio), which limits the maximum turndown ratio of the heating device. Control of the air fuel ratio becomes even more stringent as the turndown is increased, where the velocity of air through the burner is lower. It is this acceptable temperature band width that determines the required oxygen at any specific turndown. The higher the turndown, the narrower the temperature band width.

One of the limiting factors in achieving higher turndown ratios is the loss of control of the air/fuel mixture at low flow rates. Failing to achieve the theoretically ideal fuel/air mixture can result in emissions of carbon monoxide, aliphatic aldehydes, nitrous oxides, and other contaminants that are judged to be harmful. Producing those contaminants will cause a burner design to fail ANSI (American National Standards Institute) safety and performance standard tests.

In view of the above, there is a need for a boiler system having a high turndown ratio, and a related system and method for controlling a boiler to achieve a high turndown ratio.

SUMMARY OF THE INVENTION

It is an object of the present invention to provide a high turndown boiler.

It is another object of the present invention to provide a system and method for controlling a boiler to achieve high turndown.

These and other objects are achieved by the present invention.

According to one embodiment of the present invention, a heating device includes a combustion chamber, a housing in fluid communication with the combustion chamber, a burner disposed in the housing, a blower assembly connected to the housing for directing air into the interior of the housing, a valve assembly connected to the housing for controlling a flow of fuel into the burner, an optical color sensor for sensing a color profile of a surface of the burner, and a control unit configured to control the valve assembly in dependence upon the color profile of the surface of the burner.

In another embodiment, a method of controlling a gas burner includes the steps of determining a target color profile of a burner surface, the target color profile corresponding to a target temperature of the burner surface during combustion, sensing an actual color profile of the burner surface, and adjusting an amount of fuel provided to the burner in dependence upon the actual color profile.

BRIEF DESCRIPTION OF THE DRAWINGS

The present invention will be better understood from reading the following description of non-limiting embodiments, with reference to the attached drawings, wherein below:

FIG. 1 is a schematic view of a boiler system, in accordance with one embodiment of the present invention.

DETAILED DESCRIPTION OF THE PREFERRED EMBODIMENT

As shown in FIG. 1, and in accordance with a preferred embodiment of the present invention, a boiler system includes a housing 10 defining an interior boiler chamber 12 and a burner assembly 14 arranged to be in thermal communication with the boiler chamber 12. A fuel valve assembly 16 controls a flow of fuel (from an unillustrated supply of the same) to the burner assembly 14, while a blower assembly 18 directs air through an air valve assembly 20 to the burner assembly 14. An ignition device 22 is provided for instigating combustion of an inlet gas/air stream, and is arranged adjacent one edge of the burner assembly 14. This ignition device 22, commonly known as a "pilot" or "pilot burner" is in turn used to light the main burner assembly 14. FIG. 1 is a schematic representation of a boiler apparatus and as such, it will be readily appreciated that the constituent elements of the boiler apparatus may be at differing locations within and around the housing 12, without departing from the broader aspects of the present invention. As depicted in FIG. 1, both the supply of fuel and the supply of air are controlled, and isolated, from the burner assembly 14 via the integrated fuel valve and air valve assemblies, 16 and 20 respectively.

As also illustrated in FIG. 1, the boiler system 10 includes a blower assembly 24 attached to the housing for directing air to the burner assembly 14 through an adjustable shutter valve 26. The shutter valve 26 is located between the inlet of the blower assembly 14 and a venturi through which the air/fuel mixture from the air and fuel source is provided to the burner 14. The blower assembly 24 is configured to operate at a substantially constant speed, while the shutter valve 26 is controllable via the control unit 100 to adjust the amount of air/fuel mixture provided to the burner. In this respect, the shutter valve 26 is also referred to as the "turndown shutter", and the position of this shutter valve 26 is a function of the boiler input demand (and is independent of the air/fuel ratio control). The pressure across the shutter valve 26 is always negative.

In operation, the position of the shutter valve 26 is adjusted by the control unit 100 in dependence upon the boiler input demand. Air flows through the shutter 26 and draws the air/fuel mixture (provided through valves 16, 20) through the burner 14 for combustion. When operating in an optimal range or setpoint, where the air/fuel mixture is consistently ignited, combustion is consistently maintained, and harmful combustion exhaust byproducts are kept below designated limits, a surface 32 of the burner assembly will exhibit a particular color profile (as a result of a temperature of the burner). This color profile is referred to herein as a target color profile of the burner surface. For example, the target profile may have a certain amount or value for red, and a certain amount or value for violet.

As alluded to above, as input is reduced (increased turndown), the air/fuel mixture combusts closer to the burner surface and the system may exhibit a loss of control of the air/fuel mixture at low flow rates. Failing to achieve the theoretically ideal fuel/air mixture can result in emissions of carbon monoxide, aliphatic aldehydes, nitrous oxides, and other contaminants that are judged to be harmful. When operating outside of this optimal range, where these negative characteristics manifest, the burner surface 32 may exhibit an observable change in color as a result in a change in temperature of the burner surface 32.

Importantly, with further reference to FIG. 1, the boiler system 10 includes an optical color sensor 28 that extends through the housing 12 and is positioned to acquire color data (i.e., an actual color profile) of a portion of the surface 32 of the burner 14. In an embodiment, the sensor 28 may be outfitted with a fan 30 configured to cool the sensor 28. The color sensor 28 is in communication with (e.g., via wired or wireless means) the control unit 100, and is configured to transmit the acquired color data (indicating the actual color profile of the burner surface 32) to the control unit 100. At the control unit 100, the actual color profile of the burner surface 32 is compared to the target color profile of the burner surface stored in memory. If the actual color profile differs from the target color profile, the control unit 100 adjusts the position of the fuel valve assembly 16 to adjust the amount of fuel (and thus the air/fuel ratio) provided to the boiler 10 for combustion. This 'new' air/fuel ratio will combust differently, causing a change in temperature (and thus color) of the burner surface. Accordingly, the control unit 100 can continue to adjust the amount of fuel provided to the boiler until the detected/actual color of the burner surface corresponds to the target color of the burner surface, indicating near complete combustion, low emissions, etc.

In this respect, the control unit 100 is configured to precisely control the amount of fuel (and thus the particular makeup of the air/fuel mixture) provided to the boiler 10 in dependence upon an actual color profile of the burner surface. In an embodiment, color data of the burner surface can be acquired in real-time, permitting the almost instantaneous adjustment of the air/fuel ratio by the control unit 100. In an embodiment, the actual color profile of the burner surface may be an average color profile over a predetermined area of the burner surface. Importantly, the color sensor 28 observes a portion of the burner surface 32 to maintain a set color (indicating temperature) as the turndown changes. The sensor 28, as disclosed above, transmits this color information to the control unit 100 that varies the fuel through valve assembly 16 to maintain a desired color over the chosen turndown range.

As will be readily appreciated, anything that causes a shift in air/fuel ratio results in a shift in color of the burner. Thus, variations in air density due to temperature or altitude, as well as changes in the fuel supply due to temperature, density or BTU cause a change in the color of the burner (indicating sub-optimal operation). This sub-optimal operation can therefore easily be detected and remedied using the color sensing routine hereinbefore described.

A significant advantage of using an optical sensor is that its response is essentially instantaneous at any turndown. Thus, maintaining high quality combustion is only limited by the response of the optical sensor, the turndown range of the electronically controlled gas valve 16 and the inherent limits set by the burner. Another advantage of the system of the present invention is that the sensor is not in the combustion flue stream, thus eliminating any possibility of failure due to exposure to combustion gases.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A heating device capable of operating over a range of turndown ratios, comprising:
    a combustion chamber;
    a housing in fluid communication with the combustion chamber;
    a burner disposed in the housing;
    a blower assembly connected to the housing for directing air into the interior of the housing;
    a valve assembly connected to the housing for controlling a flow of fuel into the burner; and
    a control unit configured to control the valve assembly in dependence upon a color profile of a surface of the burner, said control unit controlling said valve assembly to maintain said color profile of said surface of said burner over said range of turndown ratios.

2. The heating device of claim 1, further comprising:
    an optical color sensor configured to acquire information relating to said color profile of said surface of said burner.

3. The heating device of claim 1, wherein:
    said burner includes at least one burner plate for facilitating the mixture of air and fuel to be combusted in the combustion chamber; and
    said surface is a surface of said at least one burner plate.

4. The heating device of claim 2, wherein:
    the control unit is configured to compare said color profile of said surface of said burner with a target color profile of said surface of said burner.

5. The heating device of claim 4, wherein:
    said target color profile corresponds to a temperature of said surface of said burner during optimal combustion.

6. The heating device of claim 4, wherein:
    said color profile is an average color profile across an area of said surface of said burner.

7. A method of controlling a gas burner capable of operating over a range of turndown ratios, comprising the steps of:
    determining a target color profile of a burner surface, said target color profile corresponding to a target temperature of said burner surface during combustion;
    determining an actual color profile of said burner surface; and
    adjusting an amount of fuel provided to said burner in dependence upon said actual color profile so as to maintain said actual color profile of said surface of said burner over said range of turndown ratios.

8. The method according to claim 7, wherein:
    said actual color profile is determined and updated in real time.

9. The method according to claim 7, wherein:
    said actual color profile is an average color profile over a sensed area of said burner surface.

10. The method according to claim 7, wherein:
    said target color profile includes a target red value and a target violet value.

11. A gas burner system for a heating device capable of operating over a range of turndown ratios, comprising:
    a burner having at least one burner plate for facilitating the mixture of air and fuel to be combusted in a combustion chamber;
    a valve assembly for controlling a flow of fuel to said burner;
    a blower assembly for directing air to said burner;
    an optical color sensor configured to acquire information relating to a color profile of said burner plate; and
    a control unit configured to control said valve assembly in dependence upon said color profile of said burner plate to maintain said color profile over said range of turndown ratios.

* * * * *